US008467821B1

(12) United States Patent
Noel, Jr. et al.

(10) Patent No.: US 8,467,821 B1
(45) Date of Patent: Jun. 18, 2013

(54) SYSTEM AND METHOD FOR ANTICIPATING TRANSMIT POWER REQUIREMENTS IN WIRELESS MOBILE UNITS COMMUNICATING WITH A BASE STATION

(75) Inventors: Francis Edward Noel, Jr., Durham, NC (US); Thomas Toher, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 3081 days.

(21) Appl. No.: 09/639,865

(22) Filed: Aug. 16, 2000

(51) Int. Cl.
*H04B 7/00* (2006.01)

(52) U.S. Cl.
USPC ....... 455/522; 455/69; 455/67.11; 455/67.16; 455/456.1

(58) Field of Classification Search
USPC .................. 455/67.1, 67.6, 69, 456, 522
See application file for complete search history.

(56) References Cited

U.S. PATENT DOCUMENTS

| 4,475,010 | A | | 10/1984 | Huensch et al. ............ 179/2 EB |
|---|---|---|---|---|
| 5,056,109 | A | * | 10/1991 | Gilhousen et al. ............ 370/342 |
| 5,305,468 | A | * | 4/1994 | Bruckert et al. ................ 455/69 |
| 5,394,158 | A | | 2/1995 | Chia ............................. 342/457 |
| 5,434,950 | A | | 7/1995 | Käallman ........................ 395/22 |
| 5,513,246 | A | | 4/1996 | Jonsson et al. ................. 379/60 |
| 5,564,079 | A | * | 10/1996 | Olsson ........................... 455/456 |
| 5,577,022 | A | | 11/1996 | Padovani et al. ............... 370/13 |
| 5,590,409 | A | * | 12/1996 | Sawahashi et al. ............. 455/69 |
| 5,657,487 | A | * | 8/1997 | Doner ............................ 455/456 |
| 5,722,073 | A | | 2/1998 | Wallstedt et al. ............. 455/437 |
| 5,845,208 | A | * | 12/1998 | Hottinen et al. ............. 455/436 |
| 5,854,981 | A | | 12/1998 | Wallstedt et al. ............. 455/439 |
| 5,884,163 | A | | 3/1999 | Hardouin ....................... 455/423 |
| 5,893,033 | A | | 4/1999 | Keskitalo et al. ............. 455/437 |
| 5,903,840 | A | | 5/1999 | Bertacchi ...................... 455/436 |
| 5,943,610 | A | * | 8/1999 | Endo ............................... 455/69 |
| 5,991,636 | A | * | 11/1999 | Won et al. ..................... 455/522 |
| 6,052,598 | A | * | 4/2000 | Rudrapatna et al. .......... 455/456 |
| 6,075,974 | A | * | 6/2000 | Saints et al. ..................... 455/69 |
| 6,140,964 | A | * | 10/2000 | Sugiura et al. ................ 342/464 |
| 6,240,291 | B1 | * | 5/2001 | Narasimhan et al. ......... 455/436 |
| 6,243,591 | B1 | * | 6/2001 | Takemura ..................... 455/522 |
| 6,269,246 | B1 | * | 7/2001 | Rao et al. ...................... 455/456 |
| 6,314,365 | B1 | * | 11/2001 | Smith ........................... 701/200 |
| 6,317,587 | B1 | * | 11/2001 | Tiedemann et al. ............ 455/69 |
| 6,321,162 | B1 | * | 11/2001 | Hessing ........................ 701/210 |
| 6,374,085 | B1 | * | 4/2002 | Saints et al. ..................... 455/69 |
| 6,438,356 | B1 | * | 8/2002 | Lilja et al. ...................... 455/63 |
| 6,438,376 | B1 | * | 8/2002 | Elliott et al. .................. 455/437 |
| 6,643,521 | B1 | * | 11/2003 | Bourgoin et al. ............. 455/522 |

OTHER PUBLICATIONS

Hellbrandt IEEE transactions on Vehicular technology Feb. 1997, vol. 46, Issue 1 pp. 65-71 "Estimating position and velocity of mobiles in a cellular radio network."*

* cited by examiner

*Primary Examiner* — Charles Shedrick
(74) *Attorney, Agent, or Firm* — Winstead, P.C.

(57) ABSTRACT

In wireless communications systems, power conservation is important. The communications system anticipates the need to vary the signal strength of transmitting mobile units, and provides that base station with information concerning the direction of the mobile unit relative to the base station which is utilized in handing off the mobile unit from one base station to another.

7 Claims, 5 Drawing Sheets

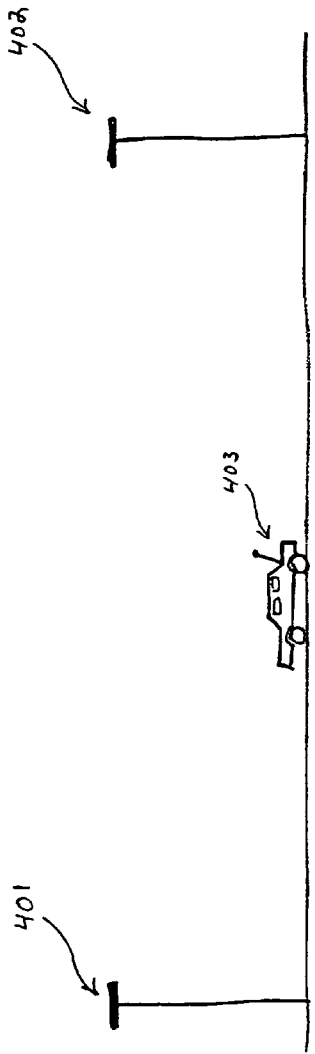
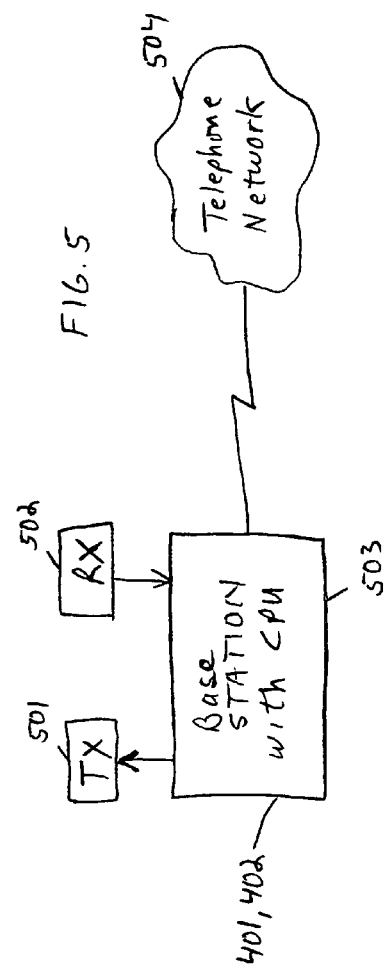

SYSTEM AND METHOD FOR ANTICIPATING TRANSMIT POWER REQUIREMENTS IN WIRELESS MOBILE UNITS COMMUNICATING WITH A BASE STATION

CROSS REFERENCE TO RELATED APPLICATION

This invention is related to U.S. patent application Ser. No. 09/413,991, entitled "Adaptive Power Control in Wideband CDMA Cellular Systems (WCDMA) and Method of Operation", which is hereby incorporated by reference herein.

TECHNICAL FIELD

The present invention relates in general to communications systems, and more particularly to adaptive power management in such communications systems.

BACKGROUND INFORMATION

Integrated circuit technology has advanced to such a degree that "Dick Tracy" type phones are now possible. Furthermore, digital cellular phones are also now capable of accessing the Internet. The problem, however, is that the power supply (i.e., batteries) technology has barely advanced over the years, and is limiting the miniaturization of such communications systems. Instead, designers of personal electronics devices have had to resort to improving the technology of the devices themselves so that they conserve as much power as possible during operation.

During standby and receive mode, most communications devices use very little power. However, the power consumption does increase significantly when such a communications device needs to transmit information, such as to a cellular base station.

Wireless technology has proceeded in three distinct steps in the area of reducing the transmit power in the mobile unit to conserve battery life. A first method for reducing the transmit power accomplishes such solely with respect to functions within the control of the handheld unit itself, such as backlight timeouts. A second method has been implemented with newer digital systems where there has been provided a signaling channel from the base station to the mobile unit. This channel is used for the base station to send a feedback signal based on the current instantaneous receive level at the base station. If that receive level is high enough, the base station sends a feedback signal to the mobile unit informing it that it can reduce its transmit power. A third method is disclosed in the above cross-referenced patent application where the system monitors the trend on the power consumption during the last two or three sampling intervals, and sends a feedback signal based on the received power trend observed.

As can be seen, current methods rely on sampling signals from the battery-powered mobile units. This cannot take into consideration other factors such as the existing charge on the battery, so the range of modification of signal strength may be quite limited. Moreover, the current state of the art in wireless communications systems cannot anticipate the need to vary signal strength until the scenario has already occurred. Finally, current technology does not provide a base station with information concerning the direction of the mobile unit relative to the base station, which would be of use in a cell hand-off situation.

SUMMARY OF THE INVENTION

The present invention addresses the foregoing needs by having each base station within a wireless communications system build a typical transmission model based on the collection of signal strength data from a number of mobile users over time and upon an interchange of signals of a known amplitude among adjacent base stations. This model can be reconstructed periodically to compensate for changing transmission conditions, and is made possible by the fact that base station antennas are typically built along major highway systems. Transmitted signals for mobile units can be compared to the model and a feedback signal can be used to adjust the transmit power of the mobile unit. Knowing the signal strength of the mobile unit and its deduced direction of travel, along with the signal strength information from other base stations, these can be used to facilitate earliest (or latest) possible hand-off to the next base station. The integration of the base station received signal levels into the model provides a better calibration point and opens up the possibility of more precise traffic management among base units. This traffic management is enhanced because it is based upon a model that is refreshed periodically to take into account the transmission environment with significantly greater precision than is currently possible.

One advantage of the present invention is that battery life in the mobile unit can be optimized by predicting the future signal from a mobile user based on current transmission conditions and using the feedback signal to the mobile unit so that it may adjust its transmit power to the minimum required.

Another advantage of the present invention is that, using the relative power level, direction of travel, and adjacent base station signal levels, the base station can create better decisions regarding the hand-off of a transmission to an adjacent base station to minimize the fading and interference as the mobile user moves from one base service station to another.

Yet another advantage of the present invention is that the use of base station transmission capacity (the number of "calls" it can handle at a given time) can be optimized by using the signal strength and direction of travel information to hand off the transmission to another base station in an area that is less busy.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which:

FIG. 4 illustrates a mobile unit being serviced by one or more base stations;

FIG. 5 illustrates a simplified block diagram of a base station; and

DETAILED DESCRIPTION

Figure 1:
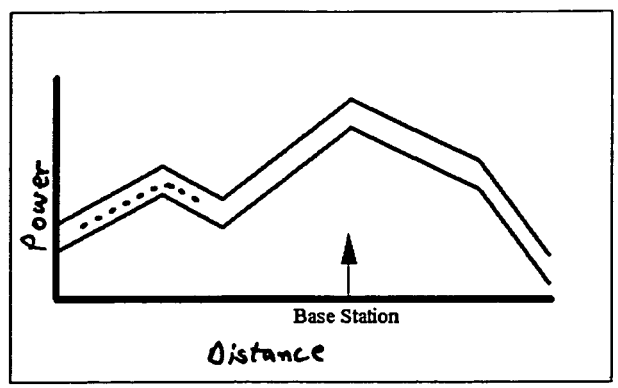
FIG. 1 illustrates a base station received power profile.

In the following description, numerous specific details are set forth such as specific wireless systems, etc. to provide a thorough understanding of the present invention. However, it will be obvious to those skilled in the art that the present invention may be practiced without such specific details. In other instances, well-known concepts have been shown in block diagram form in order not to obscure the present invention in unnecessary detail. For the most part, details concerning timing considerations and the like have been omitted in as much as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

The present invention will be described with respect to a mobile cellular unit, whether analog or digital, communicating with a plurality of base stations. However, note that the present invention is applicable to any type of wireless communications device, including wireless Internet devices. It will be assumed, though not necessary, that the mobile wireless unit is powered by a battery where power conservation is desired.

Referring to FIG. 4, there is illustrated a vehicle having a mobile wireless communications device 403 traveling so that it communicates with either of base stations 401 or 402. In the example illustrated in FIG. 4, mobile unit 403 is traveling between a communications area covered by base station 402 towards the one covered by base station 401.

FIG. 5 illustrates a simplified block diagram of base stations 401 and 402, wherein the base station includes a transmitter 501, a receiver 502, and a base station with a CPU 503. The RF communications hardware within the base station 503 is not described herein for reasons of simplicity. However, base station 503 does utilize a data processing system having a CPU, and other memory and storage devices to implement the present invention described below with respect to FIGS. 2 and 3. Base station 503 enables a mobile unit 403 to communicate to a telephone network 504.

Figure 2:
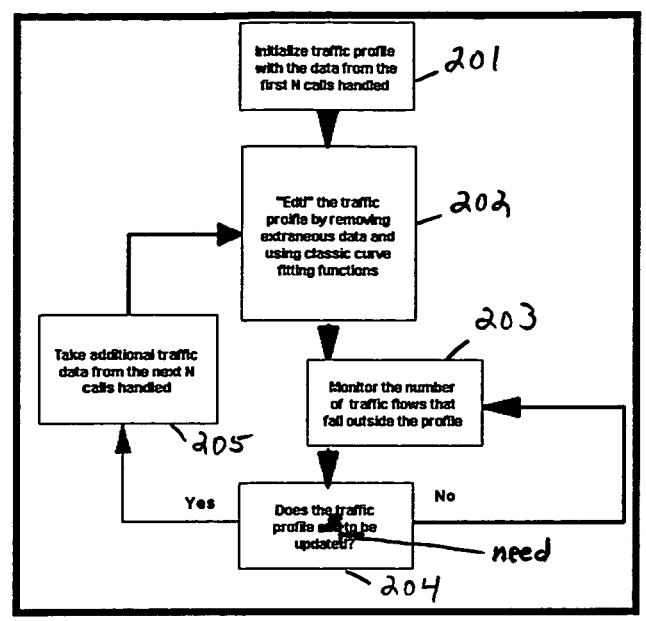
FIG. 2 illustrates a method for traffic profiling.
Figure 3:
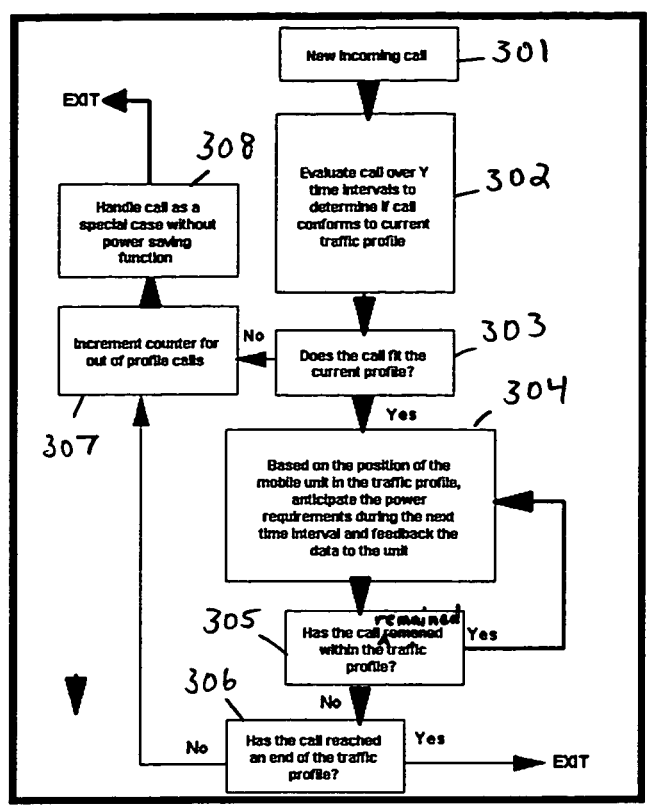
FIG. 3 illustrates a method of power monitoring and feedback.

A goal of the present invention is to implement the algorithms of FIGS. 2 and 3 to thereby send signals to the mobile unit 403 so it can then reduce its transmit power.

Referring to FIG. 1, each base station will build a typical transmission model based on the collection of signal strength data from a number of mobile users over time.

Referring to FIG. 2, there is illustrated a process for traffic profiling in accordance with the present invention. In step 201, a traffic profile is initialized with the data from the first N calls handled by a base station, such as base station 401 or 402. There are two ways to initialize the traffic profile. The first is to have a mobile station 403 move from one edge of a station's range to the other end of the station's range via the most probable path, while maintaining a constant output power. As indicated previously, this is probably along an interstate or other main traffic artery. While the mobile station 403 is transversing the path, the base station 401, 402 monitors the received signal. If this is performed several times, a highly accurate picture will be assembled of the traffic profile of interest. This process would be performed with controlled test runs using a mobile unit with a fixed output power. A second technique for initializing the traffic profile is for the base station 401, 402 to monitor a large number of calls from moment of initial reception to moment of fade out. The base station would not send the feedback signals to the mobile units that could receive them, and therefore all the units would be transmitting at the maximum output power, which would be constant. As a result the direction of travel is easily determined by taking a set of test data and determining if it fits with previously taken data, by reversing the plot, left to right, and taking the "best" one. This histogram, for example of 100 power profiles, can then be easily analyzed, either by hand or by well-known techniques to determine the minimum and maximum received data points for each location along the traffic profile. One way to accomplish this is to select from the test run data the minimum and maximum signal strength for each point along the direction of travel. Further processing of the data, using common curve fitting techniques (such as the least squares algorithm), could be utilized to smooth the minimum and maximum traffic profiles to simplify the comparison with "real data" under operational conditions.

In step 202, the traffic profile is edited by removing extraneous data and using classic curve fitting functions. The editing step removes those test data profiles (for example, out of the original 100 power profiles in the histogram) that do not fit the traffic profile because they are using other paths than the main traffic artery. Once the extraneous traffic profiles are removed from the original set, then the data is re-analyzed for the minimum and maximum signal levels.

Either of these techniques would generate the histogram illustrated in FIG. 1. In step 203, the process monitors the number of traffic flows that fall outside the profile. In step 204, a determination is made whether the traffic profile needs to be updated. If not, the process merely returns to step 203. However, if the traffic profile needs to be updated, the process proceeds to step 205 to take additional traffic data from the next N calls handled, and the process then returns to step 202. Based on traffic history, which states that if X percent of calls do not fit the profile, then if a threshold of 2× of calls do not fit the profile then the traffic profile needs to be updated. This factor of 2 may be adjusted, up or down, based on experience with weather conditions and other factors that affect the received signal strength.

Referring next to FIG. 3, there is illustrated a process whereby power is monitored and then fed back from a base station 401, 402 to a mobile unit 403. In step 301, a base station 401, 402 receives a new incoming call from a mobile unit 403. In step 302, the call is evaluated over Y time intervals to determine if the call conforms to the current traffic profile developed with respect to FIG. 2. In step 303, a determination is made whether the call fits the current profile. To see if the call fits a profile, the base station 401, 402 takes the first X samples of data and determines if the data points match either end of the profile. The signal fed back to the mobile unit is a data signal that incrementally instructs the mobile unit to increase or decrease its transmit power.

If the call does not fit the current profile, then the process will proceed to step 307 to increment a counter for out-of-profile calls. In step 308, the call is handled as a special case without any power saving function, and the process then exits.

If in step 303, the call does fit the current traffic profile, then the process proceeds to step 304, where based on the position of the mobile unit and the traffic profile, the power requirements for the mobile unit are anticipated during the next time interval and fed back to the mobile unit 403. An example of a call that would not fit the traffic profile, would be one from a vehicle traveling on a secondary road that is perpendicular to the main highway, near which the cellular antenna is located. In step 305, a determination is made whether the call remains within the traffic profile. If yes, the process returns to Step 304. If not, the process proceeds to step 306 to determine if the call has reached an end of the traffic profile. If not, the process proceeds to step 307. Otherwise, the process exits.

Figure 6:
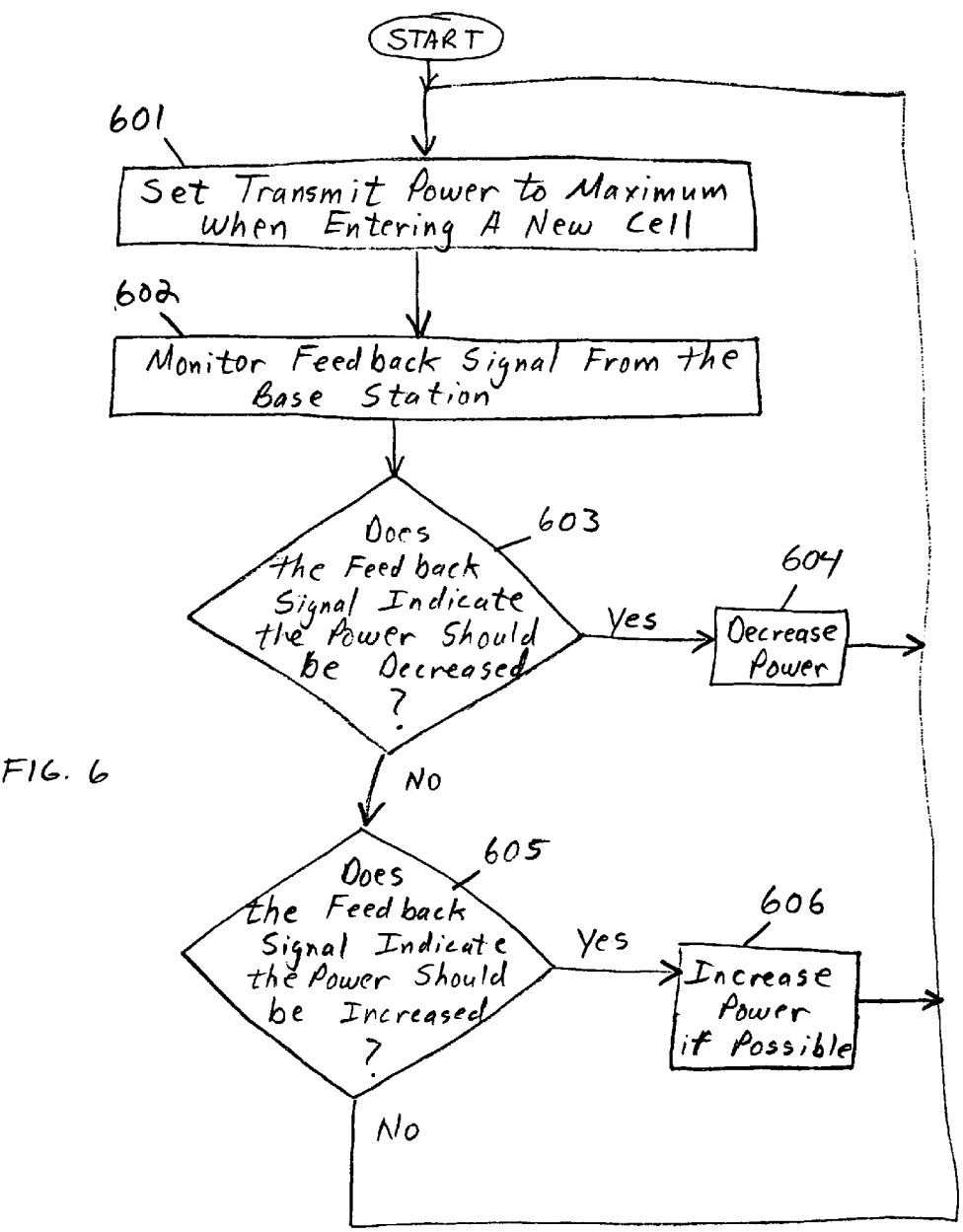
FIG. 6 illustrates a method for modifying transmit power in a mobile unit.

Referring to FIG. 6, there is illustrated a process implemented within a mobile unit for increasing or decreasing the power in the mobile unit in response to the signal fed back to the mobile unit in step 304. In step 601, the transmit power of the mobile unit is set to a maximum when entering a new cell. In step 602, the mobile unit monitors for any feedback signal from the base station. In step 603, the feedback signal received from the base station is analyzed to determine whether it is coded to indicate that the power in the mobile unit should be decreased. If yes, then in step 604, the mobile unit's transmit power is decreased. If the answer is in the negative to step 603, then the process proceeds to step 605 to determine whether the feedback signal indicates that the transmit power of the mobile unit should be increased. If yes, then in step 606, the transmit power of the mobile unit is increased, if possible.

Typically, such cellular systems will be of a digital configuration. In particular, the mobile units discussed above will need no special modification to implement the process illustrated in FIG. 6.

Although the present invention and its advantages have been described in detail, it should be understood that various changes, substitutions and alterations can be made herein without departing from the spirit and scope of the invention as defined by the appended claims.

What is claimed is:

1. A method for anticipating transmit power requirements in wireless mobile units communicating with a base station, comprising the steps of:
    establishing a two-way wireless communication between a mobile unit and the base station; and
    as a function of a position of the communication between the mobile unit and the base station in a predetermined traffic profile maintained by the base station, anticipating a transmit power requirement of the mobile unit; sending a signal from the base station to the mobile unit in response to the anticipating step, and which is operable to direct the mobile unit to either increase or decrease its transmit power during a subsequent time interval; performing the anticipating and sending steps as long as the communication between the mobile unit and the base station remains within the predetermined traffic profile; handling the communication between the mobile unit and the base station without performing the anticipating step if the communication between the mobile unit and the base station no longer conforms to the predetermined traffic profile maintained by the base station.

2. The method as recited in claim 1, further comprising the steps of
    determining if the communication between the mobile unit and the base station conforms to the predetermined traffic profile maintained by the base station; and
    handling the communication between the mobile unit and the base station without performing the anticipating step if the communication between the mobile unit and the base station does not conform to the predetermined traffic profile maintained by the base station.

3. The method as recited in claim 2, wherein the determining step is performed during one or more time periods after the communication has been established between the mobile unit and the base station.

4. The method as recited in claim 1, wherein the transmit power is used by the mobile unit to transmit information from the mobile unit to the base station during the communication between the mobile unit and the base station.

5. The method as recited in claim 1, wherein the predetermined traffic profile is based on a collection of signal strength data from a plurality of mobile units communicating with the base station over a period of time.

6. The method as recited in claim 5, wherein the position of the communication between the mobile unit and the base station in the predetermined traffic profile maintained by the base station is determined by comparing strengths of signals received from the mobile unit by the base station to the collection of signal strength data.

7. A telecommunications system, comprising:
    a base station;
    a mobile unit in wireless communication with the base station,
    circuitry in the base station for comparing signal levels received from the mobile unit during the wireless communication between the mobile unit and the base station to a predetermined traffic profile maintained by the base station;
    circuitry in the base station for anticipating a transmit power requirement of the mobile unit as a function of the comparison of the signal levels received from the mobile unit during the wireless communication between the mobile unit and the base station to the predetermined traffic profile maintained by the base station;
    circuitry for sending a signal, as a function of an output of the anticipating circuitry, from the base station to the mobile unit which is operable to direct the mobile unit to either increase or decrease its transmit power during a subsequent time interval,
    circuitry for determining, during one or more time periods after the communication has been established between the mobile unit and the base station, if the communication between the mobile unit and the base station conforms to the predetermined traffic profile maintained by the base station; and
    circuitry for handling the communication between the mobile unit and the base station without sending the signal from the base station to the mobile unit which is operable to direct the mobile unit to either increase or decrease its transmit power during a subsequent time interval.

* * * * *